United States Patent [19]

Warner et al.

[11] 4,163,177

[45] Jul. 31, 1979

[54] OSCILLATION GENERATOR PROVIDING OSCILLATIONS OF VARYING AMPLITUDE

[76] Inventors: Arthur R. Warner, 11, Portsmouth Rd., Kingston-upon-Thames, Surrey; Derrick A. Ward, 1 High Beech, Croham Manor Rd., South Croydon, Surrey, both of England

[21] Appl. No.: 842,490

[22] Filed: Oct. 17, 1977

[51] Int. Cl.$^2$ .................. H05B 37/02; H03B 3/02
[52] U.S. Cl. ...................................... 315/208; 315/205; 331/47; 331/54; 331/106; 331/114
[58] Field of Search ............. 315/205, 206, 208, 220, 315/224, 223; 331/47, 54, 106, 114

[56] References Cited

U.S. PATENT DOCUMENTS

| | | | |
|---|---|---|---|
| 2,598,473 | 5/1952 | Warner et al. | 315/205 |
| 2,892,125 | 6/1959 | Warner et al. | 315/166 |
| 3,037,145 | 5/1962 | Warner et al. | 315/166 |
| 3,424,947 | 1/1969 | Warner et al. | 315/166 X |

Primary Examiner—Alfred E. Smith
Assistant Examiner—Charles F. Roberts
Attorney, Agent, or Firm—Christie, Parker & Hale

[57] ABSTRACT

An oscillation generator providing a succession of oscillations repetitively and progressively varying in amplitude includes a feedback oscillator arranged to receive its operating voltage from a capacitor that is progressively charged from a periodically fluctuating voltage source by way of an SCR and a timing circuit arranged to progressively vary the timing during the fluctuation period of the source of firing signals applied to the SCR. The timing circuit includes a firing capacitor charged from a unidirectional source and semiconductor switches arranged, when the potential on the firing capacitor attains a predetermined level, to discharge the capacitor into the trigger electrode of the SCR. The time required for the potential on the firing capacitor to reach the predetermined level is varied by a saw-tooth generator that controls the charging potential for the capacitor. The oscillator output may be applied directly to energize an electric discharge tube, or may be applied to a power amplifier fed from a constant source, that in turn energizes a discharge tube.

13 Claims, 2 Drawing Figures

OSCILLATION GENERATOR PROVIDING OSCILLATIONS OF VARYING AMPLITUDE

BACKGROUND OF THE INVENTION

1. Field of the Invention

This invention relates to electric oscillation generators of a type suitable for supplying a high, alternating potential to an electric discharge tube used for advertising or display purposes.

2. Description of the Prior Art

It is well known that if there is applied between the electrodes of an electric discharge tube an alternating voltage of which the amplitude is less than that required to initiate discharge between the two electrodes, a discharge will extend along a portion of the tube the length of which is dependent upon the amplitude of the voltage. At low frequencies such discharge may not be readily visible owing to the low discharge current, and a satisfactory level of brightness is often reached only at frequencies of the order of tens of kilohertz.

SUMMARY OF THE INVENTION

The present invention seeks to provide a high frequency oscillation generator employing semiconductor active elements, in conjunction with a control circuit designed to effect variation of the output power of said generator. This change in output is used to vary the length of the luminous column in the electric discharge tube connected to the generator, in accordance with the kind and degree of animation effect it is desired to produce. For example, a saw-tooth voltage would be chosen to produce a writing effect by causing the luminous discharge to extend gradually along the tube till the whole tube is illuminated, followed by fast extinction; and a triangular wave if a wipe-off effect is desired after the tube is fully illuminated.

Embodiments of the invention provide oscillator circuit arrangements generating a succession of oscillations repetitively and progressively varying in amplitude, the circuit arrangement including an oscillator arranged to receive its operating voltage from a supply capacitor charged from a periodically fluctuating voltage source by way of a semiconductor controlled rectifier (SCR) and control means applying to the trigger electrode of the SCR firing pulses of which the timing varies progressively with time in a cyclically progressive manner.

DESCRIPTION OF THE PREFERRED EMBODIMENT

Figure 1:
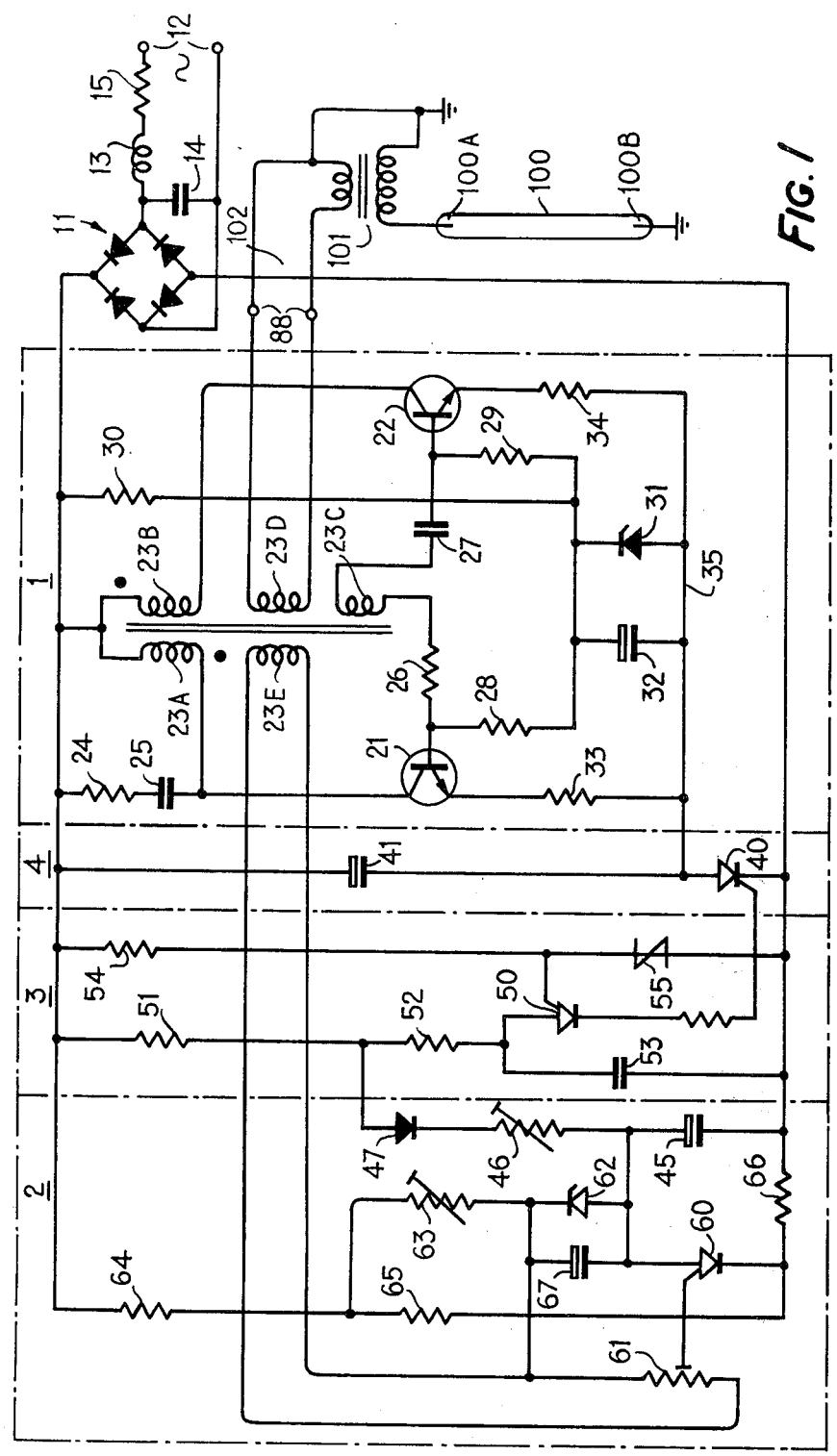
FIG. 1 shows the circuit diagram of one embodiment of oscillator circuit arrangement in accordance with the invention.

The circuit diagram of FIG. 1 shows the oscillator circuit comprising an oscillator 1, a sawtooth generator 2, a phase control circuit 3, and a thyristor circuit 4, the gate of which is fed from the phase control circuit, and the output of which provides direct current power to the oscillator, each shown within a rectangle bounded by broken lines. The sawtooth generator and phase control circuit are fed from positive half-cycles of voltage of appropriate amplitude developed across a full-wave bridge rectifier circuit 11 and derived fromn the a.-c. mains supply received at 12 via a high-frequency filter intended to prevent feedback of high-frequency voltage into the supply and comprising a choke 13 and capacitor 14 and a current limiting resistor 15.

The oscillator stage includes two power transistors 21 and 22, connected in a conventional self-oscillating push-pull circuit using a feedback transformer 23. In the collector circuits of the two transistors are connected separate primary winding portions 23A and 23B, of the oscillator transformer, wound in opposing phases. Suppression of the voltage spikes produced by the fast switching times, is achieved by a damping circuit comprising a resistor 24 and a capacitor 25 connected in series across winding section 23A.

Positive feedback to maintain a self-oscillating condition is derived from a secondary winding 23C. This drive is applied to the base circuits of the transistors 21, 22 by the oscillation frequency timing components comprising a resistor 26 connected between winding 23C and the base of transistor 21, a capacitor 27 connected between winding 23C and the base of transistor 22 and the base bias resistors 28 and 29. Forward bias applied to the transistors 21, 22 is derived from a diode starting circuit comprising a resistor 30 connected from the positive supply to the parallel combination of a diode 31 and a capacitor 32 so that the oscillator is self-starting at supply voltages of low value. The emitters of transistors 21, 22 are returned through individual resistors 33, 34 to a negative line 35, i.e. to the negative electrode of a capacitor 41, charged as is described later.

The inductance of each of the two primary winding sections 23A and 23B is made sufficiently large to support the collector current of each transistor for one half-cycle of the oscillation frequency, so that this frequency is determined by the time constant of the feedback circuit. By this means the transformer core never enters the region of magnetic saturation, so that the respective mean collector currents of transistors 21 and 22 are substantially proportional to the power demanded by the load, this latter being represented by the electric discharge tube 100.

An electric discharge tube 100 to be operated by the generated high frequency voltage is coupled to the oscillator stage by a matching transformer 101 in association with a low impedance link line 102 and a coupling winding 23D on the transformer core. The arrangement is such that if the oscillation output is increased gradually from a low value, the luminous discharge will spread gradually from the unearthed electrode 100A towards the earthed electrode 100B, and at an appropriate amplitude of oscillation will extend throughout the tube. If the oscillator output is then reduced sharply to the original low value, which may be zero, the discharge will be extinguished.

Thus, as described in U.K. Patents Nos. 399566 and 679368 corresponding to U.S. Pat. No. 2,598,473, issued May 27, 1952 to the instant applicants and entitled Electric Oscillation Generator, the discharge tube may for example be in the form of a word, so that the extension of the discharge gives the effect of the word being written.

The operating voltage applied to the oscillator is derived from the a.-c. mains supply via a thyristor 40 and an associated reservoir capacitor 41 in combination with the full-wave bridge rectifier 11 and current limiting resistor 15. The voltage across the reservoir capacitor will vary in accordance with the duty cycle of the thyristor.

A saw-tooth voltage employed to control the operating or "writing" cycle of the H.F. generator, is developed across a capacitor 45. Capacitor 45 is charged from the tapping of a voltage divider formed by resistors 64 and 65, which are connected in series across the supply, by way of an adjustable resistor 63 which serves to adjust the rate at which the capacitor is charged, and thus to pre-set the desired writing speed, i.e. the speed at which the luminous column extends along the tube. The time constant of this combination of components is typically several seconds.

The control signal for the gate of the thyristor 40 consists of positive-going pulses of short duration derived from a semiconductor switch 50 in combination with a resistance-capacitance phase-shift network. The resistive element of this phase-shift network comprises two resistors 51 and 52 that are connected in series with the capacitive element, capacitor 53, between the positive and negative supply lines. The junction of resistors 51, 52 is connected to capacitor 45 by way of an adjustable resistor 46 and a diode 47. With this arrangement positive pulses will be applied to the anode of the semiconductor switch 50 during each half-cycle of the supply voltage. The semiconductor switch 50 is biased by the potential on its anode gate, which is derived from a fixed resistance network consisting of a resistor 54 and a voltage dependent resistor (VDR) 55, so that switch 50 triggers when a predetermined voltage is applied between its anode and anode-gate electrodes. The instant in any given half-cycle at which switch 50 triggers, is thus dependent on the instant in that half-cycle at which the voltage across capacitor 53 reaches the predetermined level. This in turn is governed by the pre-selected time constant of the combination of resistors 51 and 52 with capacitor 53 and the voltage at the junction of these resistors. This voltage serves as the control magnitude, and is dependent on the charge attained by the capacitor 45, and hence by the voltage appearing across that capacitor. Therefore as the voltage across capacitor 45 rises, it permits of a corresponding increase in the voltage at the junction of resistors 51 and 52, thereby increasing the rate at which capacitor 53 attains the predetermined trigger voltage for switch 50 in each half-cycle of the supply.

The diode 47 prevents capacitor 45 from discharging into the phase-shift limb 51, 52, 53 during periods of the supply voltage cycle when the alternating voltage is lower than that on the capacitor.

By this means pulses having sharp leading edges and of progressively diminishing phase-shift with the mains supply voltage, are fed to the gate of the thyristor 40. Hence the D.C. output developed across capacitor 41 in the anode circuit of the thyristor, and therefore the output of the oscillator, will progressively increase from a minimum to a maximum value during successive cycles of the supply.

Thus it has been shown that during the period within which capacitor 45 charges from minimum to maximum value, the illumination from the electric discharge tube 100 will spread gradually from the unearthed electrode to the earthed electrode until the tube is fully lit.

It follows that to extinguish the illumination of tube 100 requires the capacitor 45 to be discharged. This discharge is effected by a semiconductor switch 60 shunting capacitor 45, and normally held in the non-conducting state. This switch is brought into conduction as required by a control voltage applied to its anode gate. This control voltage is obtained from a separate winding 23E on the oscillator output transformer 23. The level of this voltage, and therefore the instant at which capacitor 45 is discharged, is preset by a potentiometer 61. To ensure that the discharge of capacitor 53 always occurs at the required output voltage from the oscillator, the sensing signal is backed off by a reference voltage obtained from a voltage regulator diode (VRD) 62 which is shunted by a capacitor 67 and is connected by way of an adjustable resistor 63 to the junction of resistors 64 and 65 which, together with resistor 66 form a voltage divider connected across the supply. The arrangement is such that switch 60 conducts only when the sensing voltage exceeds the voltage across the VRD 62 by the critical anode gate trigger voltage. This renders the circuit relatively insensitive to mains voltage variations. After discharging capacitor 45, the switch 60 is returned to the non-conducting state by means of a positive voltage applied to its cathode and derived across the resistor 66 in the voltage divider comprising also resistors 64 and 65.

A feature of this "extinguish" circuit is that it is sensitive to the collector voltage of the oscillator transistors which in turn is proportional to the supply line voltage. Hence by limiting the maximum excursion of the collector voltage, all components are safeguarded against voltage overloads such as may arise from an open-circuit load or other fault conditions which could result in an increase in output voltage.

A refinement of the circuit is that by the inclusion of a pre-set resistor 46, control may be achieved of the "off" or "extinguish" period of the operating cycle. This resistor sets the starting point in each half-cycle of the supply at which the thyristor 40 first comes into conduction after the capacitor 45 has passed through the minimum charge condition. (This is the condition which coincides with the "off" period.)

Figure 2:
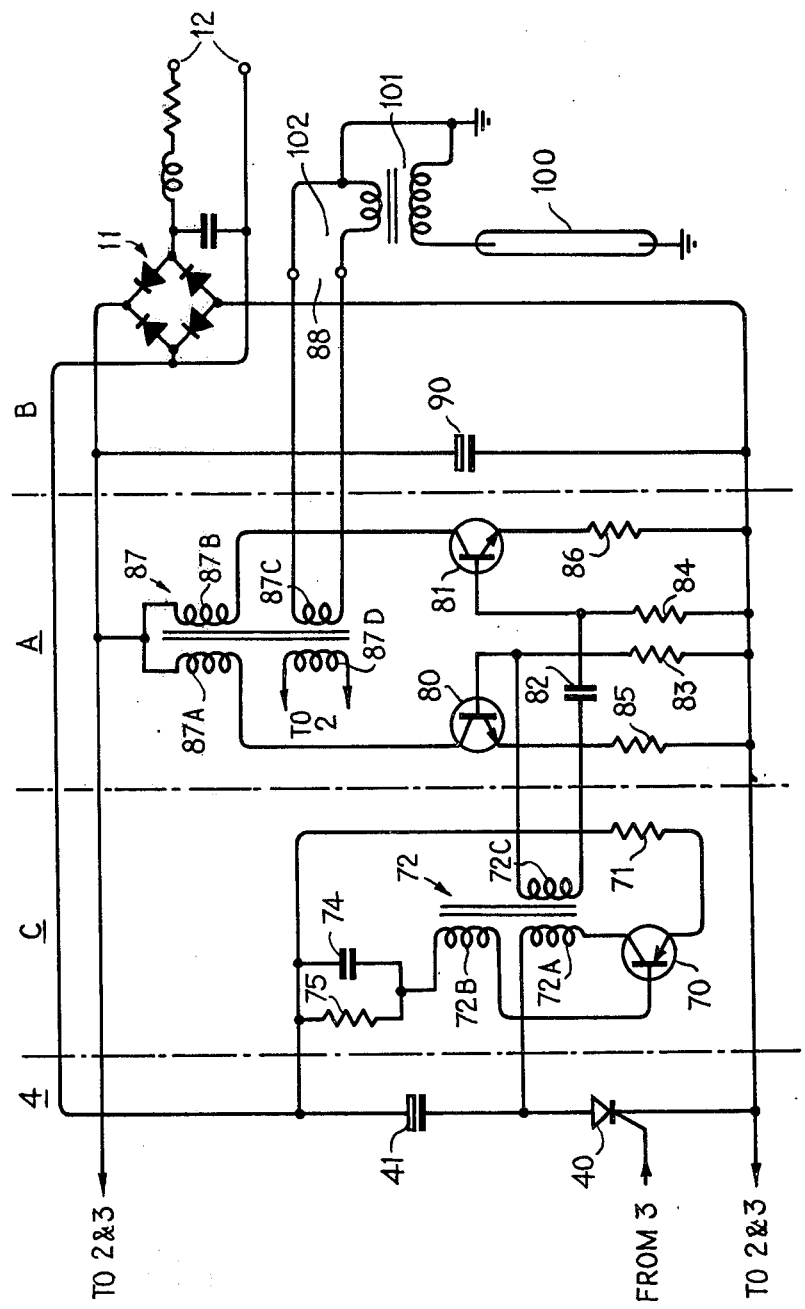
FIG. 2 shows the circuit diagram of another embodiment.

An alternative arrangement shown in FIG. 2 makes use of a power amplifier A employing semiconductor active elements powered from a fixed supply source B, and driven from a separate high frequency oscillator C, the output of which is controlled in the desired pattern. This control is achieved by means of a thyristor and associated phase shift triggering system 4 as already described in the first example, FIG. 1.

The oscillator C of FIG. 2 includes a pnp transistor 70 having its emitter returned through a resistor 71 to the positive side of capacitor 41 in thyristor circuit 4, while its collector is connected to the negative side of capacitor 41 by way of the primary winding 72A of a feedback transformer 72. Transformer 72 has also a secondary winding 72B which is connected in the base circuit of transistor 70, one end of the winding 72b being connected directly to the base of the transistor and the other end returned to the positive supply by way of the parallel combination of a resistor 74 and a capacitor 75. Transformer 72 also has a third winding 72C from which a drive voltage is taken to supply the bases of amplifier transistors 80 and 81, a capacitor 82 being connected in series with the transformer winding to provide d.c. isolation between the two bases, each of which is returned to the negative supply line by way of a respective resistor 83, 84. Transistors 80, 81 have their emitters returned to the negative supply line through individual resistors 85, 86 and their collectors connected to respective halves of a centre-tapped primary winding 87A, 87B of an output transformer 87, the centre-tap being taken to the positive supply line. Transformer 87 has a low-impedance output winding 87C which, as in the embodiment of FIG. 1, is coupled by way of output terminals 88 and a low-impedance feed line 102 to a transformer 101 supplying the discharge tube 100. Transformer 87 also has a further winding 87D which supplies a signal to sawtooth circuit 2, which operates exactly as described in relation to FIG. 1. Amplifier transistors 80, 81 and the saw-tooth and phase shift circuit sections 2 and 3, which are exactly as in FIG. 1, and are therefore not shown, are fed from a bridge rectifier 11 fed from a.-c. mains 12 as in FIG. 1, though in this case the reservoir capacitor 90 provides a substantially constant operating voltage for amplifier transistors 80 and 81.

What is claimed is:

1. In an oscillation generator providing a succession of oscillations of repetitively and progressively varying amplitude, the improvement comprising:
   oscillator means providing output oscillations varying in amplitude with an operating voltage applied thereto;
   a supply capacitor;
   a periodically fluctuating voltage source;
   charging means coupling said supply capacitor to said voltage source by way of an SCR (semiconductor controlled rectifier) to develop a voltage across said capacitor;
   means coupling said oscillator means to receive said voltage across said capacitor as said operating voltage;
   control means developing firing pulses of which the timing with respect to said fluctuating voltage varies progressively in a cyclic manner;
   and means applying said firing pulses to fire said SCR.

2. The invention claimed in claim 1, wherein said control means comprises a firing capacitor arranged to be progressively charged from a unidirectional voltage source, means connecting said firing capacitor by way of a firing semiconductor switch to the trigger electrode of said SCR; a timing capacitor; timing means arranged to charge said timing capacitor from said unidirectional voltage source; means responsive to the voltage on said timing capacitor to control the rate of charge of said firing capacitor; means coupling the trigger electrode of said firing switch to constant potential source, whereby said firing switch causes said firing capacitor to discharge into the trigger electrode of said SCR when the potential across said timing capacitor exceeds said constant potential.

3. The invention claimed in claim 2, wherein said oscillator means includes a feedback transformer having an auxiliary winding and further including a series combination of a semiconductor switch and a resistor, means coupling said series combination in shunt with said timing capacitor, a potentiometer coupled to said auxiliary winding, means coupling the slider of said potentiometer to an electrode of said semiconductor switch and means coupling one end of said potentiometer to another electrode of said semiconductor switch by way of a bias potential source.

4. The invention claimed in claim 1, wherein said supply capacitor is connected by way of said SCR across the output of a bridge rectifier arranged to be fed from alternating-current mains, said bridge rectifier output also constituting said unidirectional voltage source.

5. The invention claimed in claim 1, wherein said supply capacitor is connected by way of said SCR between one output terminal of a bridge rectifier and one pole of alternating-current mains applied to said rectifier and wherein the unidirectional voltage output of said rectifier constitutes said unidirectional voltage source.

6. An oscillator circuit arrangement in accordance with claim 1, wherein an auxiliary winding on a feedback transformer of said oscillator means is arranged to feed an alternating voltage of progressively varying amplitude to output terminals of said arrangement.

7. The invention claimed in claim 1, wherein said oscillator means includes a feedback transformer having an auxiliary winding, and further including a power output stage having input terminals and output terminals, a unidirectional voltage source coupled to feed said power output stage, and means coupling said auxiliary winding to said output stage input terminals whereby said oscillations of progressively varying amplitude appear at said output terminals.

8. The invention claimed in claim 7, wherein said power output stage unidirectional voltage source comprises rectifier means energised from said source of periodically fluctuating voltage.

9. The invention claimed in claim 1, wherein said oscillator means includes a feedback transformer having an auxiliary winding coupled to output terminals, whereby said oscillations of progressively varying amplitude appear at said output terminals.

10. The invention claimed in claim 1 and further including means coupling said oscillations to an electric discharge lamp.

11. An oscillator circuit arrangement in accordance with claim 2, wherein an auxiliary winding on a feedback transformer of said oscillator means is arranged to feed an alternating voltage of progressively varying amplitude to output terminals of said arrangement.

12. An oscillator circuit arrangement in accordance with claim 3, wherein an auxiliary winding on a feedback transformer of said oscillator means is arranged to feed an alternating voltage of progressively varying amplitude to output terminals of said arrangement.

13. An oscillator circuit arrangement in accordance with claim 4, wherein an auxiliary winding on a feedback transformer of said oscillator means is arranged to feed an alternating voltage of progressively varying amplitude to output terminals of said arrangement.

* * * * *